United States Patent [19]

Siow et al.

[11] Patent Number: 5,608,605
[45] Date of Patent: Mar. 4, 1997

[54] APPARATUS FOR SECURING A DEVICE VIA PC CARD SLOT AND DOOR

[75] Inventors: Wee M. Siow; Ting Y. Hoong, both of Singapore, Singapore

[73] Assignee: Hewlett-Packard Company, Palo Alto, Calif.

[21] Appl. No.: 535,686

[22] Filed: Sep. 28, 1995

[51] Int. Cl.$^6$ ............................... G06F 1/16; H05K 7/12; E05B 73/00
[52] U.S. Cl. ........................... 361/684; 361/683; 361/726; 70/14; 70/58; 70/163
[58] Field of Search .................................. 70/14, 18, 58, 70/158, 159, 163, 166–169; 364/708.1; 360/137; 361/683, 684, 724, 727, 737

[56] References Cited

U.S. PATENT DOCUMENTS 4,616,490  10/1986  Robbins ........................ 70/14
4,655,057  4/1987  Derman ........................ 70/14

Primary Examiner—Michael W. Phillips

[57] ABSTRACT

An electronic device having a PC card slot is secured by an apparatus inserted into the PC card slot. The apparatus tethers or otherwise secures the electronic device to a display stand. The securing apparatus includes a lock structure and a key structure. The lock structure slides into the PC card slot and locks into place. The lock structure includes a portion shaped to PC card standards, a groove area trailing the PC-card shaped portion, and a blocking portion trailing the groove portion. Upon installation, the PC card slot door closes into the groove portion. The lock structure also includes one or more security barriers and an area for receiving the key structure. The key structure defines one or more slots corresponding to the security barriers. The security barriers and key slots mate as the key structure slides into the groove portion. The key's progress into the groove pushes the PC card slot door out of the groove freeing the lock structure for removal.

12 Claims, 4 Drawing Sheets

APPARATUS FOR SECURING A DEVICE VIA PC CARD SLOT AND DOOR

BACKGROUND OF THE INVENTION

This invention relates generally to tethering and securing of point-of-sale electronic devices. More particularly, this invention relates to an apparatus for tethering an electronic device to a display stand via the device's PC card slot.

As a precaution against theft, retailers often lock small expensive electronic devices in glass display cases. With the maturing market for small expensive electronic devices, many manufacturers launch lines of similar products. The customer needs to evaluate the various models in a line and the various lines of differing manufacturers to make a buying decision. Many small electronics devices, such as pocket diaries, electronic organizers, and palmtop computers are sophisticated devices with differing interfaces and "feels." As a result, the customer typically will not be content to base the buying decision upon a look through the display case. The customer demands hands-on access to these expensive devices.

A customer typically views the products through the display case, and if interested, asks the salesperson to show them the device. This procedure is inconvenient to the customer and to the retailer. The procedure inconveniences the customer by requiring the customer to contact the salesperson before evaluating and handling the product. The procedure inconveniences the retailer by requiring the salesman to stay with a customer who is just looking. It makes the shopping experience unpleasant when the customer hurriedly handles the merchandise while the salesperson waits nearby. Thus, the customer desires time and space to exercise an electronic device before making a purchase.

Retailers recognize the need to display these electronic devices in a manner enabling the customer to use, evaluate and compare differing device types and models. To prevent customers from walking off with the devices, there is need of an apparatus for securing the devices to the display stand. Conventional ways of securing merchandise to a display stand include attaching the base of the device to the stand or tethering the device to the stand. Common tethers include straps, chains and steel wires. Effective tethering often requires drilling a hole in the merchandise casing. This has the unfavorable effect of making the merchandise unsellable. Such approach also can be troublesome, as it requires certain skill and special tools. A less effective tethering approach is to glue a clip at one end of the tether to the merchandise, while permanently attaching the other end to the display stand. Often these clips come off leaving the merchandise unsecured.

SUMMARY OF THE INVENTION

This invention is directed to an alternative device for tethering or otherwise securing electronic devices at the point-of-sale. According to the invention, an electronic device having a PC card slot is secured by an apparatus inserted into the PC card slot. The apparatus tethers or otherwise secures the electronic device to a display stand or nearby fixture.

According to one aspect of the invention, the securing apparatus includes a lock structure and a key structure. The lock structure slides into the PC card slot and locks into place. In one embodiment, the PC card slot door closes upon a groove of the lock structure to secure the lock structure. The lock structure in turn is secured to the display stand, (e.g., directly or via a tether). To release the lock structure from the electronic device, the key structure is inserted into the lock structure. The key structure then is manipulated freeing the lock structure to slide away from the PC card slot.

According to another aspect of the invention, the lock structure includes a portion shaped to PC card standards or similar proprietary requirements enabling the structure to slide into the PC card slot. The lock structure includes a groove area trailing the PC-card shaped portion. A blocking portion trails the groove portion. Upon insertion, once the PC-card shaped portion progresses past the PC card slot door, the door closes into the groove. The blocking portion prevents the lock structure from progressing further into the PC card slot. The PC-card shaped portion prevents the lock structure from sliding back out the PC card slot. The PC-card slot door is wedged into the groove between the PC-card shaped portion and the blocking portion, so as to secure the lock structure in place. In one embodiment one end of a tether is permanently attached to the lock structure. Another end of the tether is fixed to a display stand or a nearby fixture.

According to another aspect of the invention, the lock structure also includes one or more security barriers and an area for receiving the key structure. The security barriers are positioned adjacent to both the groove portion and the area for receiving the key structure.

According to another aspect of the invention, the key structure defines one or more slots corresponding to the security barriers. In operation, the key structure is inserted into a receiving area of the lock structure. If such key structure is the appropriate key for the specific lock structure, then the key slot(s) line up with the security barrier(s) allowing the key structure to slide past the security barrier(s) into the lock structure's groove portion. The security barrier(s) and key slot(s) mate as the key structure slides into the groove portion. The key's progress along the groove portion pushes the PC card slot door out of the groove. This action frees the lock structure. With the key structure inserted, a salesperson can remove the lock structure from the PC card slot.

According to another aspect of the invention, the key structure further includes a lockset for fixing the key structure in place relative to the lock structure. While fixed in place the key structure can not slide into the lock structure. The lockset includes a locked position and an unlocked position. The key structure can not slide while the lockset is locked. The key structure can slide while the lockset is unlocked. In one embodiment a conventional key adjusts the lockset between the locked and unlocked positions.

One advantage of the invention is that small electronic devices having a PC card slot can be secured yet remain accessible for customers to use, evaluate and compare. The benefit of the lockset is that the key structure can be left in place at the "locked" lock structure, while the salesperson, store manager or another appropriate person holds the conventional key. Another advantage of the lockset, is that leaving the key structure in place blocks off access to the PC card slot preventing the lock from being "picked."

These and other aspects and advantages of the invention will be better understood by reference to the following detailed description taken in conjunction with the accompanying drawings.

DESCRIPTION OF SPECIFIC EMBODIMENTS

Overview

Figure 1:
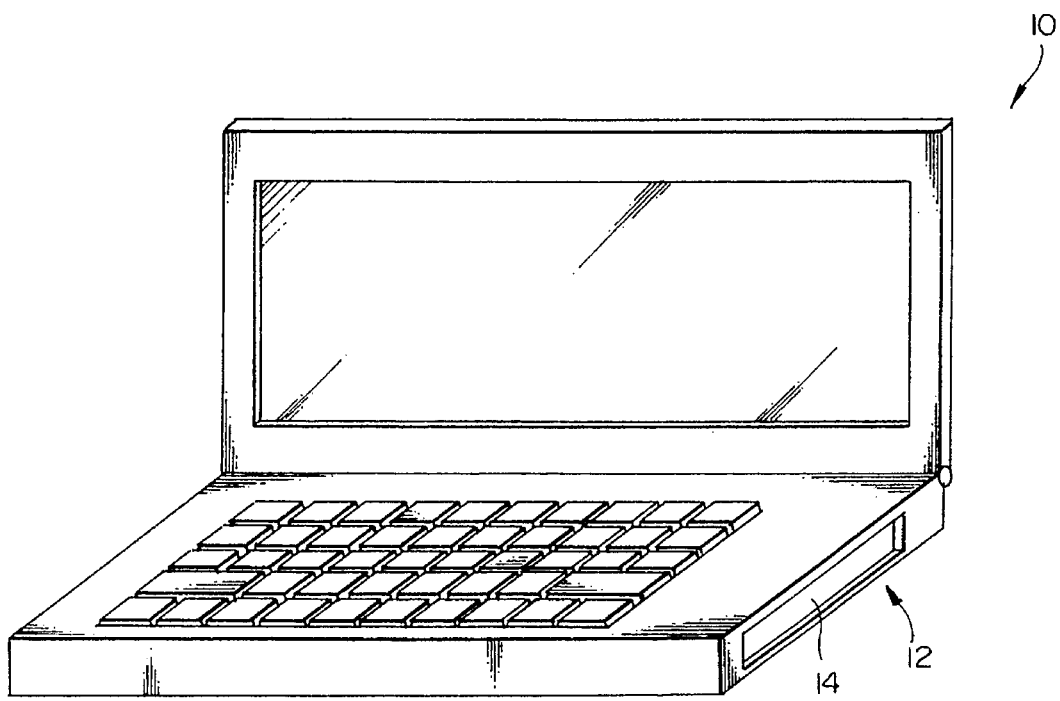
FIG. 1 is a perspective view of a conventional electronic device having an electronic card slot.

FIG. 1 shows a portable electronic device 10, such as a palmtop computer, pocket diary, electronic organizer having an electronic card slot 12. A an electronic card slot door 14 allows access to the slot 12. Typically the door 14 is spring-biased to a closed position. Other portable electronic devices having electronic card slots or the like are expected to include, cellular phones, cellular fax devices, dedicated computing devices and small general purpose computing devices.

A common electronic card slot for portable computing devices is the PC card slot. Other proprietary specifications card slots also may embody the electronic card slot 12.

The PC card slot is a standard card slot defined by the Personal Computer Memory Card International Association (PCMCIA). The PCMCIA is a group of manufacturers and vendors formed to promote a common standard for personal computer-based peripherals, primarily on laptop, palmtop, and other portable computing devices. A PC card is an add-in card that conforms to the PCMCIA specification. The PC card is a removable device approximately the same size as a credit card (54 mm×85.6 mm) designed to plug into a PC connector. Release 1 of the PCMCIA specification, introduced in September 1990, specified a Type I card that is 3.3 mm thick. Type I cards are primarily memory-related peripherals, such as RAM, ROM, EEPROM, and flash memory. Other peripherals such as sound cards are also available as a Type I PC card. Release 2 of the PCMCIA specification, introduced in September 1991, specified a Type II card that is 5.0 mm thick, and a Type III card that is 10.5 mm thick. Type II cards accommodate devices such as a modem, fax, network interface, or sound card. Type III cards accommodate devices that require more space, such as a wireless communications device or a rotating storage media (e.g., hard disk). A revision of the PCMCIA standard is under consideration for a PC card 32, that may include support for a 32-bit bus interface, multifunction cards, and power management.

A conventional PC card includes a female connector which couples to a 68-pin male connector inside a PC slot. The male and female connectors are the same for Type I, Type II and Type III PC cards. Because, the card heights vary among types, however, Type I, Type II and Type III slots differ. In particular, the slot widths are the same but the slot heights differ. Typically, a Type I slot can accommodate only a Type I PC card. Typically, a Type II slot can accommodate only a Type II or a Type I PC card. A Type III slot can accommodate a Type III, Type II or a Type I PC card.

Figure 2:
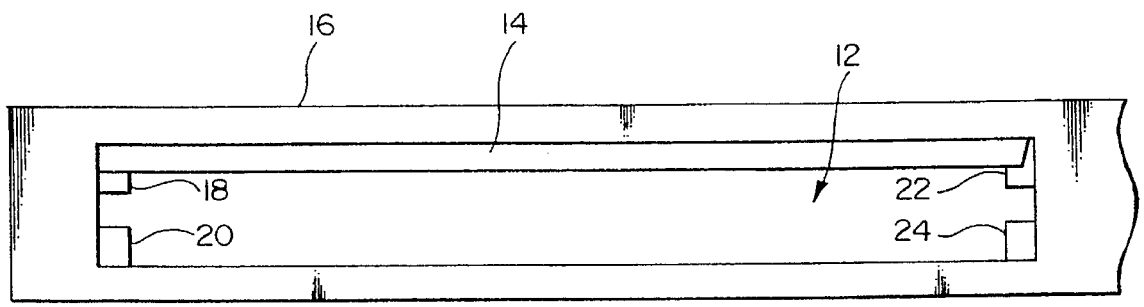
FIG. 2 is a planar view of the card slot of the device of FIG. 1.

FIG. 2 shows a portion 16 of the electronic device 10, including the electronic card slot 12 and electronic card slot door 14. Typical of the electronic card slot are rails 18, 20, 22, 24 for receiving edges of an electronic card. The edges typically defines ridges for riding the rails. The rails 18–24 and corresponding ridges align to a specific orientation assuring the electronic card is properly inserted. If, for example, a PC card is inserted upside down, then the rails and ridges do not align preventing mating of the PC card with a PC card connector within the PC card slot.

The locking structure of this invention includes ridges for riding the rails 18–24 of the electronic card slot. The shape and number of rails and ridges vary according to electronic card slot embodiments (e.g., PC card slot, proprietary card slot or other exposed electronic card slot).

Securing Apparatus

Figure 3:
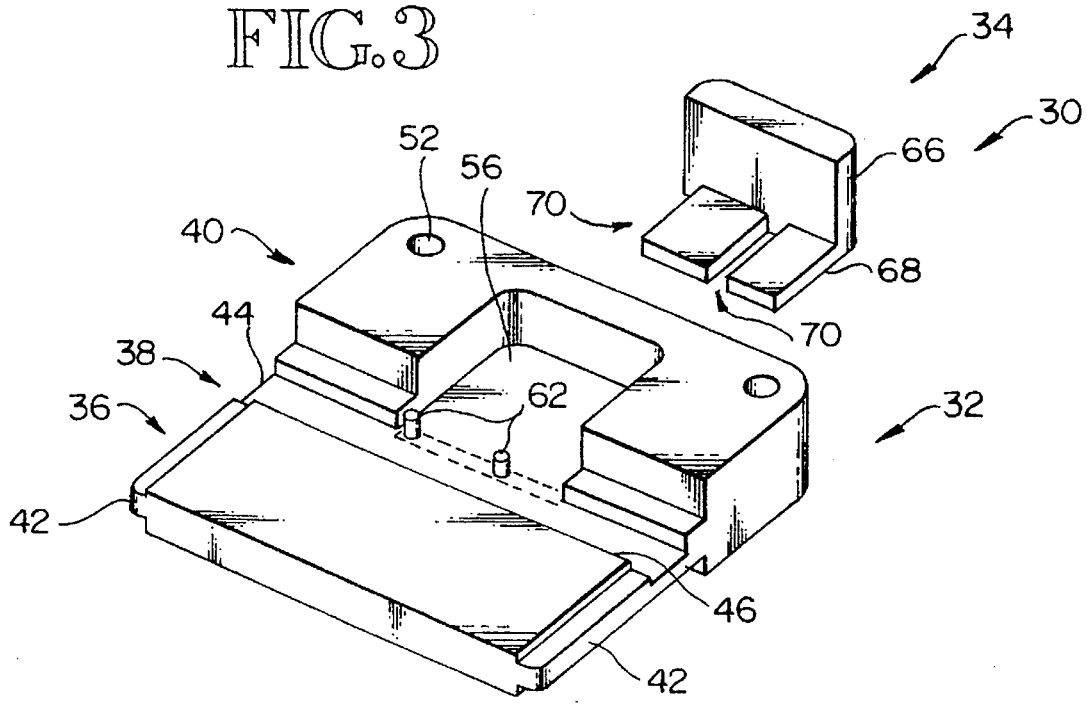
FIG. 3 is a perspective view of the securing apparatus according to an embodiment of this invention.

FIG. 3 shows an embodiment of a securing apparatus 30 according to an embodiment of this invention. The securing apparatus includes a locking structure 32 and a key structure 34. The locking structure 32 slides into the electronic card slot 12 of an electronic device 10, where it locks into place. The locking structure is tethered or otherwise secured to a display stand or nearby fixture limited displacement of the electronic device 10 relative to a display stand. The key structure 34 is used for releasing the locking structure 32 from the electronic device 10.

The locking structure 32 includes a lead portion 36, groove portion 38 and blocking portion 40. The lead portion 36 is inserted into the electronic card slot 12. The lead portion is shaped to card slot 12 specifications. Accordingly, the lead portion 36 is a generally planar structure having a ridge 42 at each side. The shape of the area between the sides need not be planar, but simply conform to the electronic card slot so as to freely slide and fit within the card slot 12. The ridges 42 are shaped to conform to the openings defined by the card slot rails 18–24.

Trailing the lead portion 36 is the groove portion 38. The groove portion 38 includes a groove 44 recessed relative to the lead portion 36. The groove is defined by a wall 46 along its length. Although the wall 46 is shown extending the length of the groove 44, the wall 46 need not extend the entire length.

Trailing the groove portion 38 is the blocking portion 40. The blocking portion 40 spans a height greater than that of the electronic card slot 12. As a result, the blocking portion prevents the lock structure 32 from being inserted into the card slot 12 beyond a specific point. In particular this serves to prevent the lock structure from damaging internal electronics within the card slot 12. In one embodiment the blocking portion 40 includes one or more through-channels 52. One channel 52 receives a tethering fixed at an opposing end to a display stand or fixture. The other channel 52 receives a tether or wire for an electronic pointing device (e.g., mouse, stylus).

The blocking portion 40 also includes an area 56 for receiving the key structure 34. In one embodiment the receiving area 56 is a recessed area level with the groove 44. In another embodiment, the receiving area is a through-opening adjacent to the groove portion 38.

The lock structure 32 also includes one or more security barriers 62 for blocking groove access to non-conforming keys. The key structure 34 includes a grip portion 66 and one or more protrusions 68. The protrusions 68 define one or more channels 70 aligned to receive corresponding security barriers 62.

Locking/Securing Operation

Figure 4:
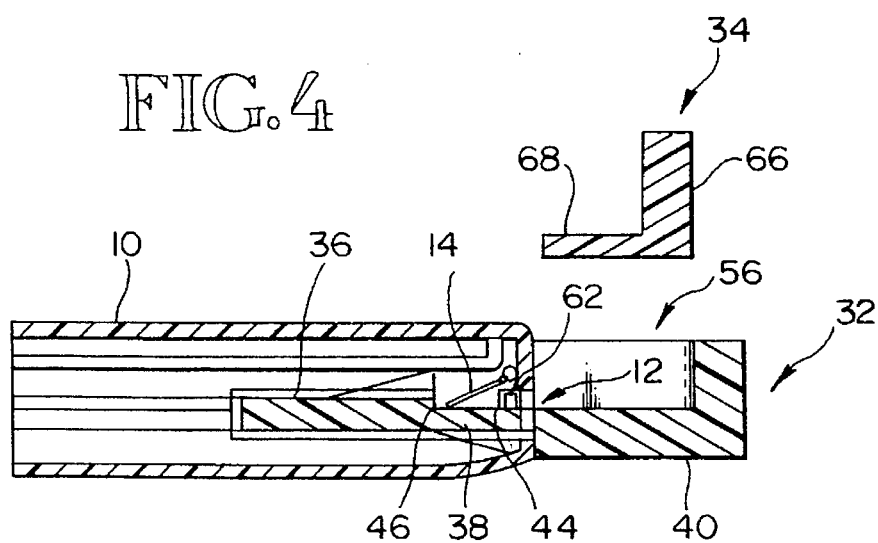
FIG. 4 is a planar view of the lock structure of FIG. 3 inserted into the card slot of FIG. 2.

Referring to FIG. 4, the lock structure 32 is secured to the electronic device 10 by inserting the lock structure 32 into the electronic card slot 12. The lead portion 36 is inserted first pushing the electronic card slot door 14 open. The groove portion 38 trails the lead portion as the lead portion 36 slides into the slot 12. As the lead portion 36 slides into the slot 12, the lead portion 36 keeps the door 14 open. At a specific insertion depth, the lead portion 36 passes beyond the door 14 and the bias on the door 14 starts the door along a closing path. The door 14 moves into the groove 44 where it encounters a floor of the groove 44. The floor 44 prevents the door 14 from closing all the way.

To prevent a user from inserting the lock structure 32 too far into the card slot 12 or from jamming the lead edge of the locking structure 32 into an edge connector within the card slot 12, the blocking structure 40 limits further insertion. Specifically, the block structure has a thickness exceeding the slot 12 opening so that the blocking portion 40 is unable to fit into the card slot door 14.

The locking structure 32 is now locked within the card slot 12. The locking structure is blocked from being extracted by the door 14. Specifically, the card slot door 14 is wedged within the groove 44 and blocked by the wall 46. Note that the wall 46 need not extend the entire length of the groove and may be merely a post or other protrusion blocking the door 14 from opening during a motion to extract the locking structure 32. Thus, the wall 46 blocks the locking structure 32 from being extracted, while the blocking portion 40 blocks the locking structure 32 from being further inserted. The locking structure 32 is locked in place.

Figure 5:
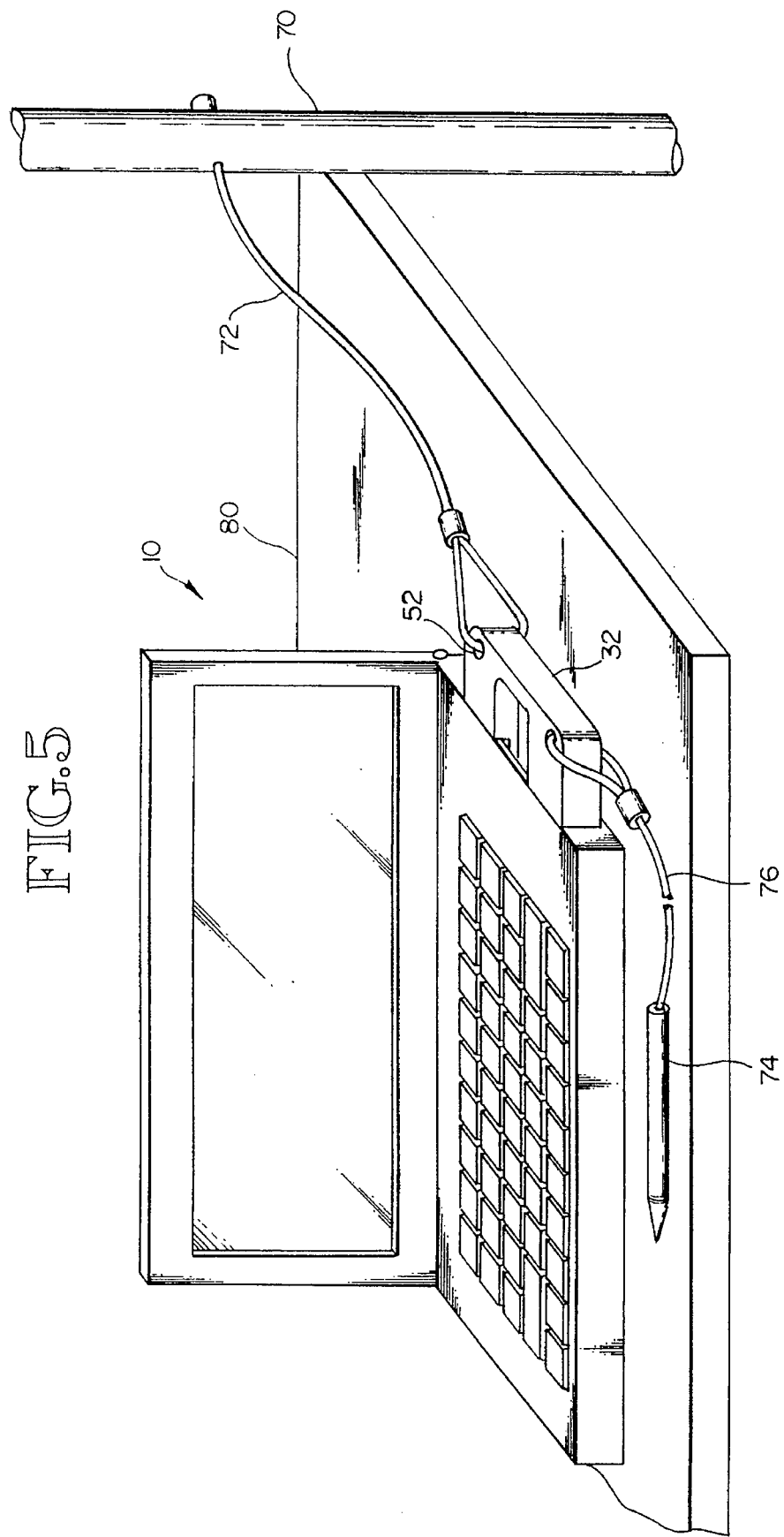
FIG. 5 is a perspective view of an electronic device tethered to a display stand via the lock structure of FIG. 3.
Figure 6:
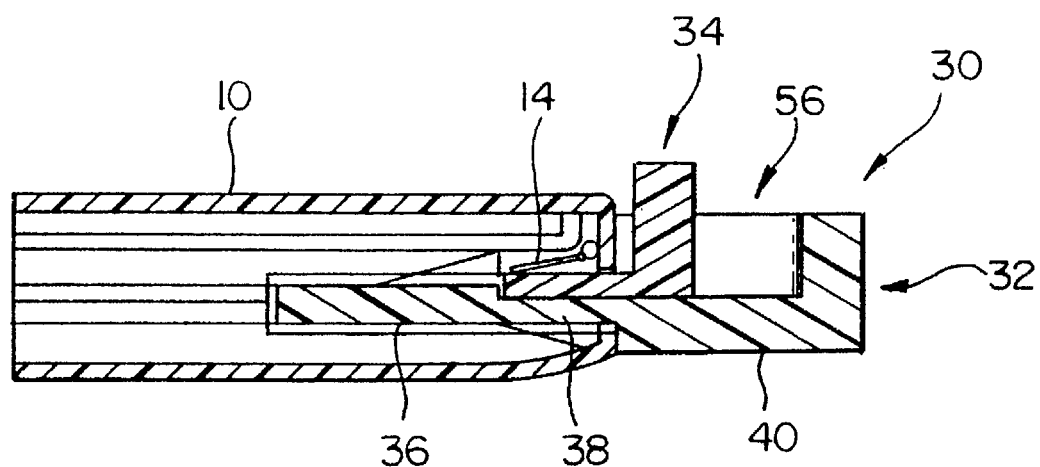
FIG. 6 is a planar view of the lock structure of FIG. 3 inserted into the card slot of FIG. 2, along with the key structure of FIG. 3 inserted into the lock structure.

FIG. 5 shows the electronic device 10 secured to a display stand 70. The locking structure 32 is locked into the electronic card slot 12. A tether 72 is attached at one end to the display stand 70, and at another end to the locking structure 32 at the through-channel 52. A pointing device 74 also is secured to the lock structure 32 via another tether 76 at another through-channel 52. In an alternative embodiment, a common tether is used for multiple electronic devices 10. In another embodiment the tether 72 is fixed to a nearby fixture instead of to the display stand. Preferably the electronic device 10 is tethered to allow displacement of the electronic device 10 within a local area in the vicinity of the display stand 70. In yet another embodiment, the locking structure 32 is fixed to the display shelf 80 and the electronic device 10 slid into or out of the locking structure 32. For example, the locking structure 32 is glued, fastened or otherwise affixed to the display stand 70.

Unlocking Operation

With the locking structure 32 locked within the electronic card slot 12 as shown in FIG. 4, unlocking is achieved via the key structure 34. Referring to FIGS. 3–6, the key structure 34 is inserted into the receiving area 56 of blocking portion 40. The protrusions 68 extending from the gripping portion 66 then are slid into the electronic card slot 12. Specifically, the key structure slides from the blocking portion 40 into the groove 44. For the key structure 34 specimen designed for a given lock structure 32, the protrusions 68 slide past the security barriers 62. The security barriers, in effect, mate to the openings 70 of the key structure 34. For an improper key structure or other structure, the security barriers 62 serve to hinder access to the groove 44.

As the key structure 34 slides across the width of the groove, the distal ends of the protrusions 68 push the card slot door 14 out of the groove 44. Specifically, the protrusions 68 push the door 14 above the height of the wall 46. With the key structure 34 inserted and the door 14 raised above the wall 46, the lock structure 32 is unhindered, allowing a user to withdraw the lock structure 32 from the slot 12.

Additional Security

Figure 7:
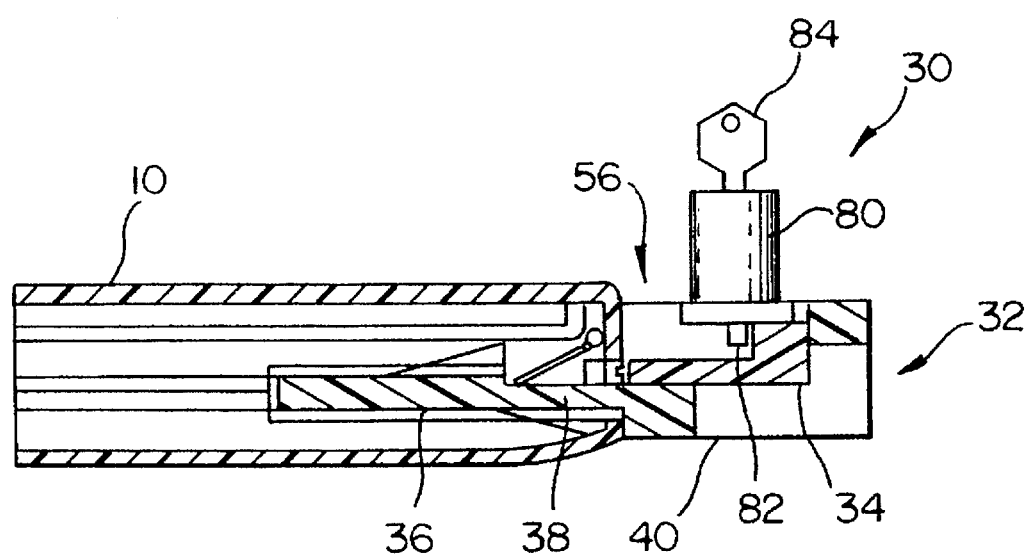
FIG. 7 is a perspective view of the lock structure and key structure of FIG. 3 along with a lockset for fixing the key structure relative to the lock structure.

FIG. 7 shows the security apparatus 30 of FIGS. 3–7 with an additional component for added security. Although the security barriers 62 on the lock structure 32 are for the purpose of limiting access to the appropriate key structure, openings between the barriers 62 allow a determined would-be thief to insert a pick toward the door 14. To further safeguard the electronic device 10 and secure the locking structure 32, jamming the receiving area 56 with the key structure 34 precludes access to the security barriers 62. FIG. 7 shows an embodiment in which a lockset 80 jams the key structure 34 within the receiving area 56. The lockset includes a plunger 82 and a key 84. The key 84 is received into the lockset 80 to vary the lockset between a locked position and an unlocked position. In the locked position, the plunger 82 is extended blocking the key structure 34 from entering the card slot 12 or groove 44. In addition, the key structure 34 blocks off access to the card slot 12. With the card slot 12 blocked the lock structure 32 can not be picked.

To remove the locking structure 32, the key 84 is turned putting the lockset 80 into the unlocked position. As a result, the plunger 82 retracts allowing the key structure 34 to move. The user then can slide the key structure 34 into the slot 12 and groove 44 pushing the slot door 14 out of the groove. With the key structure 34 inserted, the lock structure 32 can be extracted from the slot 12.

Meritorious and Advantageous Effects

One advantage of the invention is that small electronic devices having an electronic card slot can be secured yet remain accessible for customers to use, evaluate and compare. A benefit of the lockset is to block access to the card slot preventing the securing apparatus from being "picked."

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. In combination an electronic device and an apparatus for securing the electronic device at a display stand, the electronic device having an electronic card slot and an electronic card slot door, the securing apparatus comprising:

a key structure and a lock structure;

the lock structure comprising a first portion shaped for entry into the electronic slot, a second portion trailing the first portion, a third portion trailing the second portion, and a security barrier adjacent to the second portion and the third portion; wherein the second portion defines a recessed area relative to the first portion and third portion; and wherein the third portion defines an area for receiving the key structure adjacent to the security barrier;

the key structure defining an opening for mating to the security barrier;

wherein the lock structure is locked in place upon insertion into the electronic card slot and released by sliding the key structure along the lock structure to mate the opening and security barrier.

2. The combination of claim 1, in which the electronic card slot door closes into the recessed area of the lock structure upon insertion of the lock structure into the electronic card slot.

3. The combination of claim 2, in which the first portion of the lock structure is blocked against removal from the electronic card slot by the electronic card slot door.

4. The combination of claim 2, in which the third portion of the lock structure blocks the recessed area from traveling within the electronic card slot beyond the electronic card slot door.

5. The combination of claim 1, in which the key structure comprises a projection for moving the electronic card slot door out of the recessed area while the key structure is inserted in the lock structure, the key structure freeing the lock structure to be removed from the electronic card slot.

6. The combination of claim 1, further comprising means for releasably fixing the key structure to the lock structure.

7. The combination of claim 1, further comprising a tether coupled to the lock structure.

8. A method for releasably securing an electronic device to a display stand, the electronic device having an electronic card slot and an electronic card slot door, the method comprising the steps of:

inserting a lock structure into the electronic card slot, the lock structure comprising a first portion, a second portion trailing the first portion, a third portion trailing the second portion, and a security barrier adjacent to the second portion and the third portion, the second portion defining a recessed area relative to the first portion and third portion, the third portion defining an area for receiving a key structure;

closing the electronic card slot door into the recessed area;

blocking the first portion against removal from the electronic card slot with the electronic card slot door;

blocking the recessed area from traveling within the electronic card slot beyond the electronic card slot door; and securing the lock structure to a local area in the vicinity of the display stand.

9. The method of claim 8 in which the Step of securing comprises tethering the lock structure.

10. The method of claim 8, further comprising the steps of:

inserting a key structure into the receiving area, the key structure comprising a projection; and sliding the key structure from the receiving area into the recessed area to move the electronic card slot door out of the recessed area and free the lock structure for removal from the electronic card slot.

11. The method of claim 8, further comprising the step of restricting key structure movement relative to the recessed area, the key structure positioned in the receiving area, the key structure comprising a projection.

12. The method of claim 11, furthering comprising the steps of:

freeing key structure movement relative to the recessed area; and sliding the key structure from the receiving area into the recessed area to move the electronic card slot door out of the recessed area and free the lock structure for removal from the electronic card slot.

* * * * *